US008322764B2

(12) United States Patent
Miller et al.

(10) Patent No.: US 8,322,764 B2
(45) Date of Patent: Dec. 4, 2012

(54) MODULAR LONG HANDLED TOOL COMPONENT SYSTEM

(75) Inventors: G. Ray Miller, Addison, TX (US); Charles Fallen, III, Brandon, FL (US); Robert C. Mouch, Red Oak, TX (US)

(73) Assignee: Mag-Lok Tools, Inc., Dallas, TX (US)

( * ) Notice: Subject to any disclaimer, the term of this patent is extended or adjusted under 35 U.S.C. 154(b) by 354 days.

(21) Appl. No.: 12/802,727

(22) Filed: Jun. 11, 2010

(65) Prior Publication Data

US 2011/0303055 A1 Dec. 15, 2011

(51) Int. Cl.
*A01B 1/22* (2006.01)
*B25G 3/02* (2006.01)

(52) U.S. Cl. ................................ 294/51; 294/57; 15/145

(58) Field of Classification Search .................... 294/49, 294/51, 57; 15/145; 172/375
See application file for complete search history.

(56) References Cited

U.S. PATENT DOCUMENTS

| | | | | | |
|---|---|---|---|---|---|
| 798,172 | A | * | 8/1905 | Ducret | 279/99 |
| 1,398,342 | A | | 11/1921 | Pleaue | |
| 1,935,748 | A | | 11/1933 | Roff | |
| 2,013,626 | A | * | 9/1935 | Cowdery | 294/49 |
| 2,163,676 | A | | 6/1939 | Gizzarelli | |
| 3,114,401 | A | | 12/1963 | Johnson | |
| 3,255,792 | A | | 6/1966 | Beck | |
| 3,508,455 | A | | 4/1970 | Miller | |
| 3,588,931 | A | | 6/1971 | Jones | |
| 4,162,132 | A | | 7/1979 | Kress et al. | |
| 4,183,385 | A | | 1/1980 | Burkybile | |
| 4,209,865 | A | | 7/1980 | Kozlowski | |
| 4,317,248 | A | | 3/1982 | Smith | |
| 4,433,931 | A | * | 2/1984 | Malish et al. | 403/194 |
| 4,476,597 | A | | 10/1984 | Gobbi | |
| 4,606,089 | A | | 8/1986 | King | |
| 4,691,954 | A | | 9/1987 | Shaud | |
| 4,779,493 | A | | 10/1988 | White | |
| 4,786,095 | A | | 11/1988 | Dumont | |
| 4,960,016 | A | | 10/1990 | Seals | |
| 5,086,674 | A | | 2/1992 | Her | |
| 5,185,992 | A | | 2/1993 | Garcia | |
| 5,207,754 | A | * | 5/1993 | Harrah | 15/147.1 |
| 5,255,575 | A | | 10/1993 | Williams | |
| 5,297,306 | A | | 3/1994 | Shandel | |
| 5,310,230 | A | * | 5/1994 | Carmien | 294/49 |

(Continued)

FOREIGN PATENT DOCUMENTS

DE 198810237 12/1988

(Continued)

OTHER PUBLICATIONS

Youroutdoors, Inc., The Perfect Garden Tool, http://www.perfectgardentool.com, Jun. 2, 2010, pp. 1-2.

*Primary Examiner* — Dean Kramer
(74) *Attorney, Agent, or Firm* — Schultz & Associates, P.C.

(57) ABSTRACT

An industrial long handled tool component system is provided having interchangeable tool heads, connectors, handles and grips. The novel connector system provides a polygonal locking bar concentric with a round outer reinforcing collar both engaged by a material connector insert and separated by plastic isolations seals. The novel connector promotes connection integrity and prevents joint movement. An alternate embodiment provides a connector system without the collar to save weight and manufacturing cost.

27 Claims, 12 Drawing Sheets

U.S. PATENT DOCUMENTS

| | | | |
|---|---|---|---|
| 5,331,869 | A | 7/1994 | Webb |
| 5,379,542 | A | 1/1995 | Guzman |
| 5,461,849 | A | 10/1995 | Allen |
| 5,606,758 | A | 3/1997 | Tung |
| 5,752,285 | A | 5/1998 | Bendheim et al. |
| 5,860,337 | A | 1/1999 | Janssen |
| 5,894,765 | A | 4/1999 | Anderson et al. |
| 5,915,482 | A | 6/1999 | Carruthers |
| 6,347,562 | B1 | 2/2002 | Gerber |
| 6,408,606 | B1 | 6/2002 | Hsu |
| 6,439,630 | B1 | 8/2002 | Eatmon |
| 6,494,121 | B1 | 12/2002 | Hu |
| 6,511,199 | B1 | 1/2003 | Chung |
| 6,701,626 | B2 | 3/2004 | Knoop |
| 6,745,652 | B2 | 6/2004 | Chen |
| 6,928,899 | B1 | 8/2005 | Lin |
| 7,219,382 | B2 | 5/2007 | Johnson |
| 7,261,022 | B1 | 8/2007 | Hsieh |
| 2002/0088088 | A1 | 7/2002 | Lin |
| 2004/0244117 | A1 | 12/2004 | Huang |
| 2006/0130621 | A1 | 6/2006 | Novak et al. |
| 2007/0272061 | A1 | 11/2007 | Hsieh |
| 2009/0217536 | A1 | 9/2009 | Medhurst |

FOREIGN PATENT DOCUMENTS

| | | |
|---|---|---|
| DE | 29607820 | 9/1996 |
| DE | 20220786 | 5/2004 |
| EP | 0968793 | 10/2003 |
| EP | 2030735 | 3/2009 |
| GB | 880941 | 10/1961 |
| GB | 1235666 | 6/1971 |
| GB | 1454223 | 11/1976 |
| GB | 2069914 | 9/1981 |
| TW | 306921 | 3/2007 |
| WO | WO 2005/025811 | 3/2005 |
| WO | WO 2009/125030 | 10/2009 |

* cited by examiner

MODULAR LONG HANDLED TOOL COMPONENT SYSTEM

FIELD OF THE INVENTION

The present invention relates to industrial long handled tools. In particular, the invention relates to interchangeable long handled tool component systems with interchangeable parts and capable of use in demanding environments.

BACKGROUND OF THE INVENTION

Many industrial tasks such as construction, road building and fire fighting require use of long handled tools for sweeping, digging, and raking. Such tasks typically have been accomplished by separate long handled brooms, shovels of various kinds, axes and rakes. The tasks are often rigorous and take place in caustic environments. Prior art long handle tools typically suffer from design weakness at the point where the handle connects to the tool head, often resulting in premature failure. If one part of the tool fails, the entire tool requires replacement. Replacement results in waste of the parts of the tool that are still operable. Also, industrial tasks are often completed under circumstances that require transport and storage of the tools. For example, in fire fighting applications, all tools must be transported to and from a fire and often carried by hand to remote locations. In other situations, caustic environments cause premature aging and failure of the tools. For example, spreading lime, asphalt and concrete creates a particularly demanding environment for tools due to chemical corrosion and rust.

Various methods have been tried in the prior art to address these problems. None have been entirely successful.

U.S. Pat. No. 4,162,132 to Kress, et al. discloses a set of garden or household implements comprising different heads which can be attached to a handle by a coupling. The coupling comprises a sleeve inserted into the handle, a hexagonally shaped handle on each head, an annular retaining ring and a threaded pin abutting the handle and forcing the handle into the sleeve. The coupling limits the extent to which the handle can be inserted therefore limiting the integrity of the connection. Further, the coupling and the annular ring allow for movement from impact vibrations increasing wear and tear to the coupling thereby reducing the useful life of the tool.

U.S. Pat. No. 4,606,089 to King discloses a ground working implement having a handle and a plurality of nested implement heads. Each implement head includes a tang adapted to be received by a socket assembly on the handle. A retaining pin secures the tang to the socket assembly. The socket assembly is permanently integrated into the handle and therefore is not interchangeable. The retaining pin and tang are subject to movement during use which lessens the strength of the coupling and leads to premature wear.

U.S. Pat. No. 4,786,095 to Dumont discloses a gardening hand tool fitted with interchangeable heads secured by a toggle. A tool head receives the handle and includes a toggle catch. The toggle is permanently attached to one end of the handle and includes a spring loop for engagement with the catch. The tool is not modular and the toggle does not provide a vibration free attachment nor is it designed for rigorous use.

U.S. Pat. No. 5,185,992 to Garcia discloses a garden tool assembly comprising a first connection and a second connection. The first connection is mounted to the handle of a traditional tool. The second connection receives an alternate tool head. The system requires manipulation of two tool heads. The connections are not secure but allow for translated vibration and movement leading to premature tool failure.

Therefore, there is a need for a long handled tool system made up of interchangeable parts that, when assembled, provide high strength and rigidity suited for industrial use. It is desirable to provide a long handled tool system that reduces storage space required for multiple tools and extends the useful life of each tool by providing for replacement of only damaged parts. It is also desirable that the assembled tool be more durable than prior art long handle tools and be resistant to caustic and abrasive work environments. It is further desirable to provide a coupling that reduces or eliminates vibrations between its parts during use thereby extending the useful life of the tool.

SUMMARY OF INVENTION

Accordingly, an embodiment of the tool system includes a collection of interchangeable tool heads, connectors, handles, and hand grips. Each tool head includes a receiver. The receiver includes an outer reinforcing collar and a concentrically aligned locking bar having a polygonal cross section. The receiver is removably coupled to a connector. The connector includes an axially aligned locking bar hole having a polygon shaped cross section for receiving the locking bar. An outer diameter is provided that nests within the outer reinforcing collar. A shoulder abuts the reinforcing collar. A plastic sleeve is positioned between the locking bar hole and the locking bar to reduce vibrations and provide electrical isolation. A flexible gasket is positioned between the shoulder and the receiving collar. The connector is removably coupled to the handle. A grip is also removably attached to the handle. The handle is of composite construction including an inner steel tube surrounded by an outer plastic tube. The handle may be filled with a shock absorbing polystyrene foam.

An alternate embodiment includes a tool head integrally formed with a receiver where the receiver is removably coupled to an alternate connector. The receiver has a polygonal cross section adapted to fit the alternate connector. The alternate connector includes a polygonal shaped cross section receiver hole. An angled extension may also be removably incorporated between the receiver and the connector to provide a variable angle of attack.

Those skilled in the art will appreciate the above-mentioned features and advantages of the invention together with other important aspects upon reading the detailed description that follows in conjunction with the drawings provided.

BRIEF DESCRIPTION OF THE DRAWINGS,

In the detailed description of the preferred embodiments presented below, reference is made to the accompanying drawings.

DETAILED DESCRIPTION OF THE PREFERRED EMBODIMENT

Figure 1:
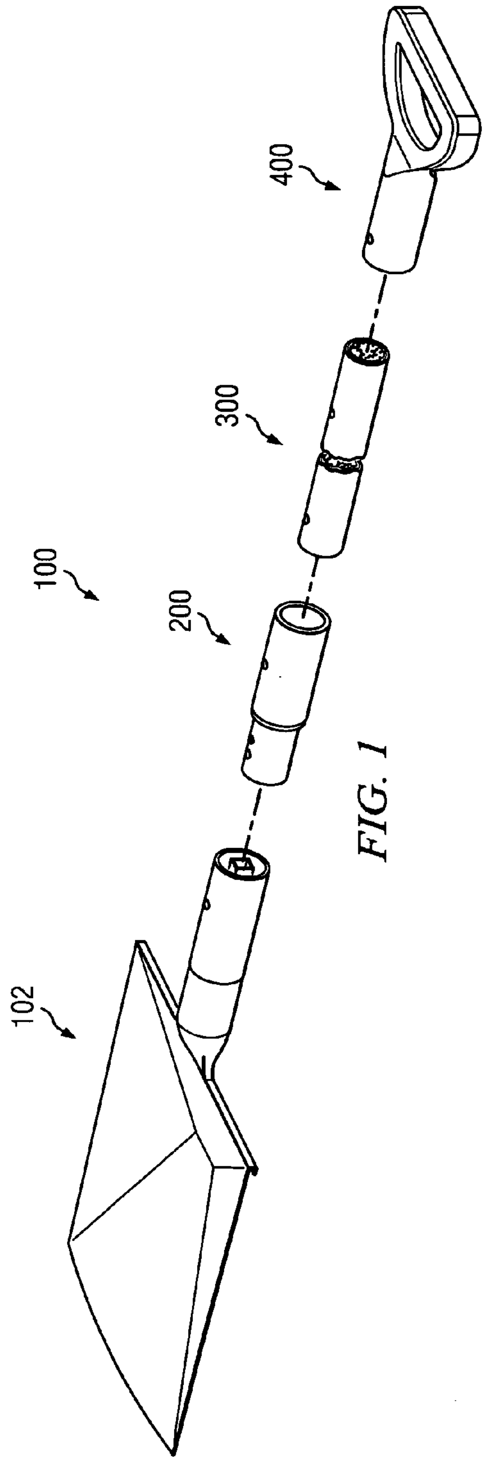
FIG. 1 is an exploded isometric view of a preferred embodiment of the modular tool component system.
Figure 2A:
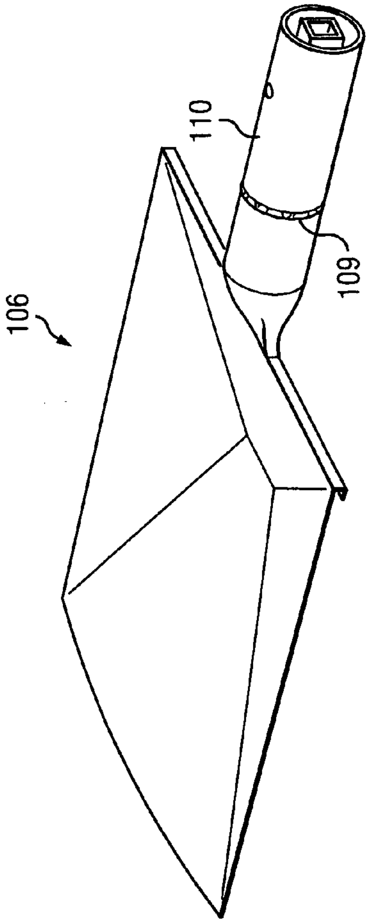
FIG. 2A is an isometric view of a preferred embodiment of a shovel head.
Figure 2B:
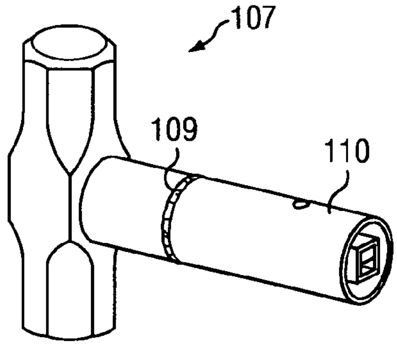
FIG. 2B is an isometric view of a preferred embodiment of a hammer head.
Figure 2C:
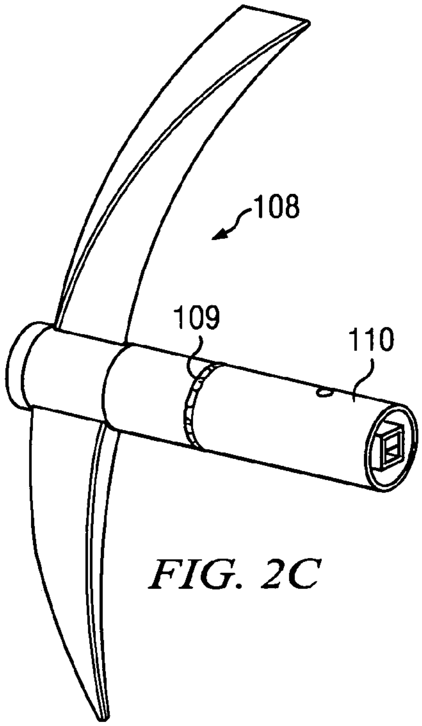
FIG. 2C is an isometric view of a preferred embodiment of a pick-axe head.
Figure 2D:
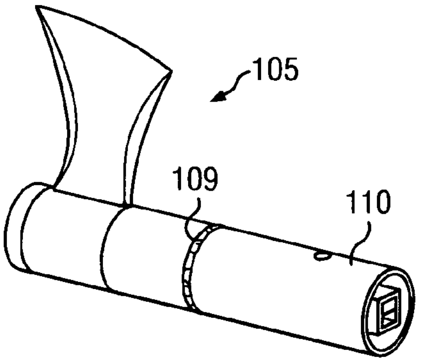
FIG. 2D is an isometric view of a preferred embodiment of a axe head.
Figure 2E:
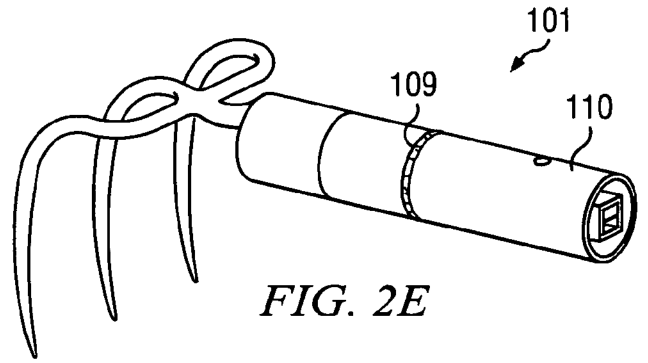
FIG. 2E is an isometric view of a preferred embodiment of a rake head.
Figure 2F:
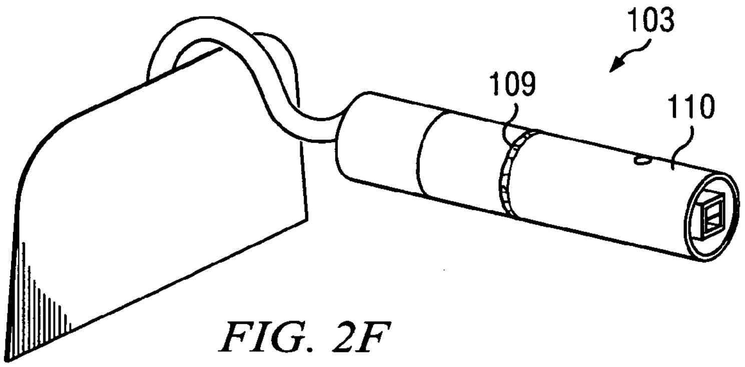
FIG. 2F is an isometric view of a preferred embodiment of a hoe head.
Figure 2G:
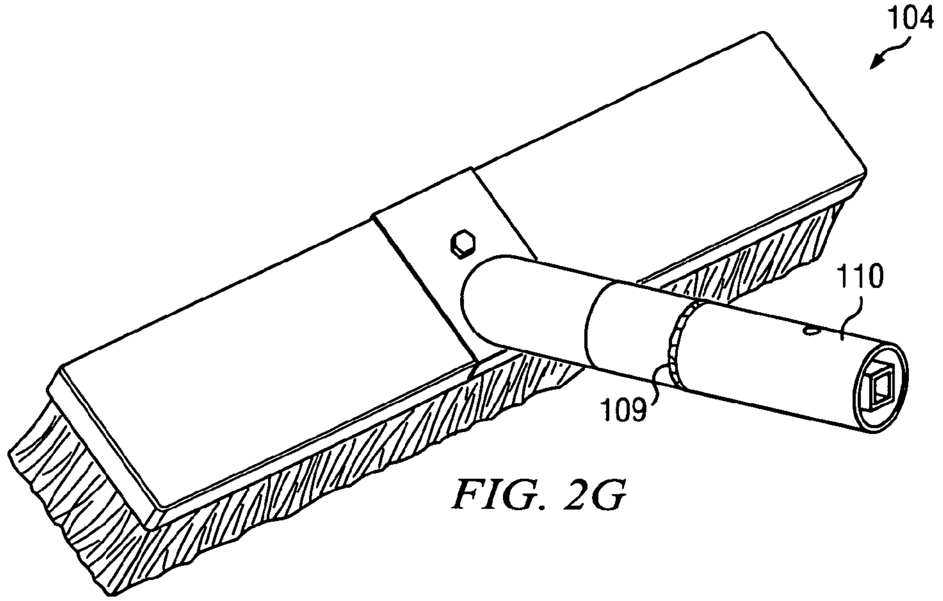
FIG. 2G is an isometric view of a preferred embodiment of a broom head.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

A preferred embodiment of tool component system 100 is shown in FIG. 1. Generally, tool component system 100 comprises tool head 102 axially aligned with and removably coupled to connector 200. Connector 200 is axially aligned with and removably coupled to handle 300. Handle 300 is axially aligned with and removably coupled to grip 400.

The preferred embodiment includes several tool heads adapted to be removably and securely attached to the connector. Examples are shovel type implements, pick axe type implements, axe type implements, hammer type implements, rake type implements, hoe type implements, and broom type implements.

FIGS. 2A-2G show examples of such implements including shovel head 106, pick-axe head 108, axe head 105, hammer head 107, rake head 101, hoe head 103, and broom head 104. The shovel head 106 may include any number of different shovel head types including but not limited to a flat head, a round head, a spade shovel, or a sand shovel. Additionally, the other tool head shapes are not limited to the shapes and dimensions shown, but can be any type of hammer, rake/cultivator, hoe, or broom shape as is common in the art. Weldment 109 permanently secures each tool head to its receiver 110.

Figure 3:
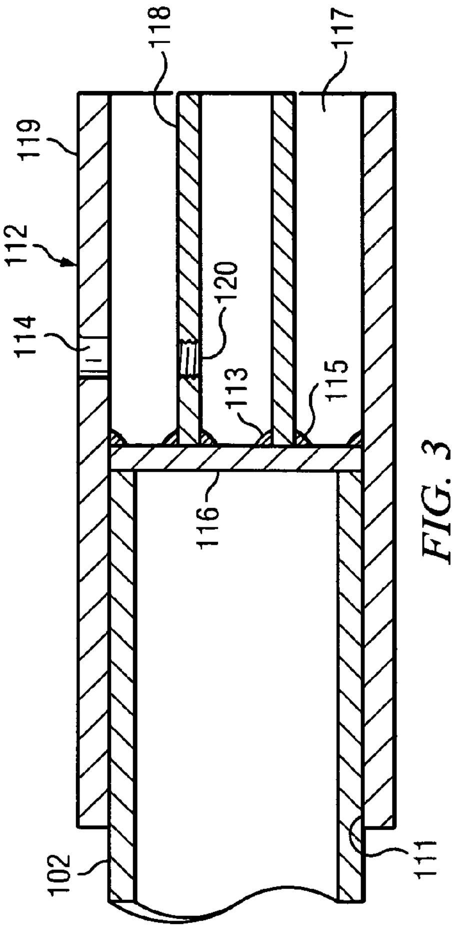
FIG. 3 is a cross-sectional plan view of a preferred embodiment of a receiver.
Figure 4:
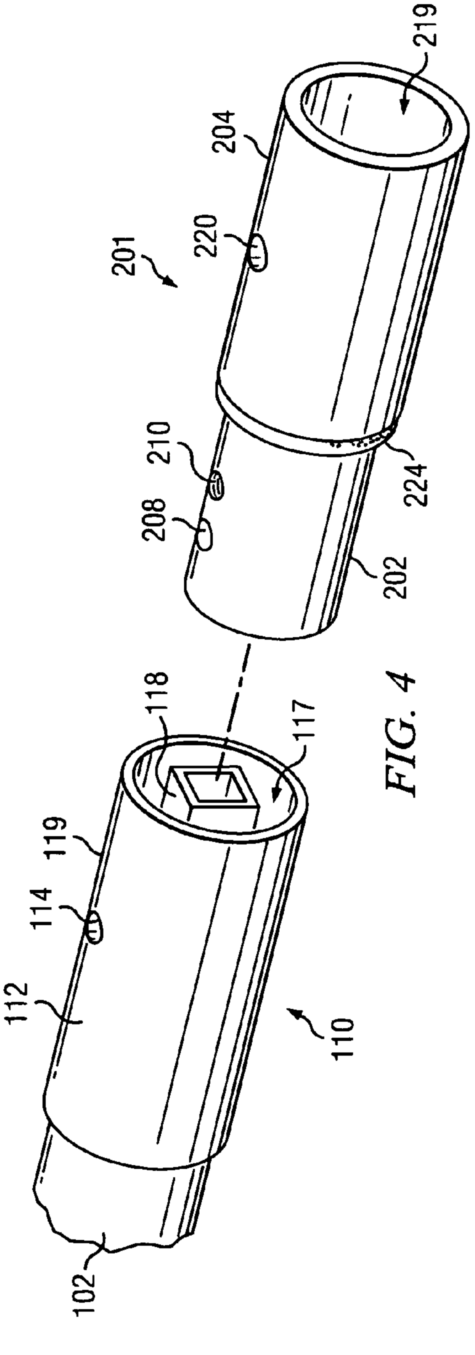
FIG. 4 is an exploded isometric view of a preferred embodiment of a receiver and a connector.

Referring to FIGS. 3 and 4, receiver 110 is generally cylindrical. In the preferred embodiment, the receiver is formed of steel, a steel alloy or a stainless steel. Receiver 110 includes receiver body 112 including a fixed, perpendicularly oriented supporting disk 116. Opening 111 in receiver 110 is attached to tool head 102 by welding or epoxy adhesive. Locking bar 118 is rigidly affixed to disk 116 and is concentrically aligned with receiving body 112. In the preferred embodiment, internal weldment 113 and external weldment 115 rigidly attach locking bar 118 to disk 116. Other methods of rigid attachment as known in the art may be employed. As shown, locking bar 118 has a square cross section. Other polygonal shaped cross sections may be employed. Locking bar 118 is of a length that terminates flush with outer reinforcing collar 119. Other lengths of the locking bar function with varying degrees of success. Adjacent to and surrounding locking bar 118 is outer reinforcing collar 119. Locking bar 118 in the preferred embodiment is hollow to reduce weight. In other embodiments locking bar 118 may be solid. Between locking bar 118 and outer reinforcing collar 119 is opening 117. Reinforcing collar 119 further includes through hole 114. Threaded hole 120 is located on one side of locking bar 118 and is axially aligned with through hole 114.

Figure 5:
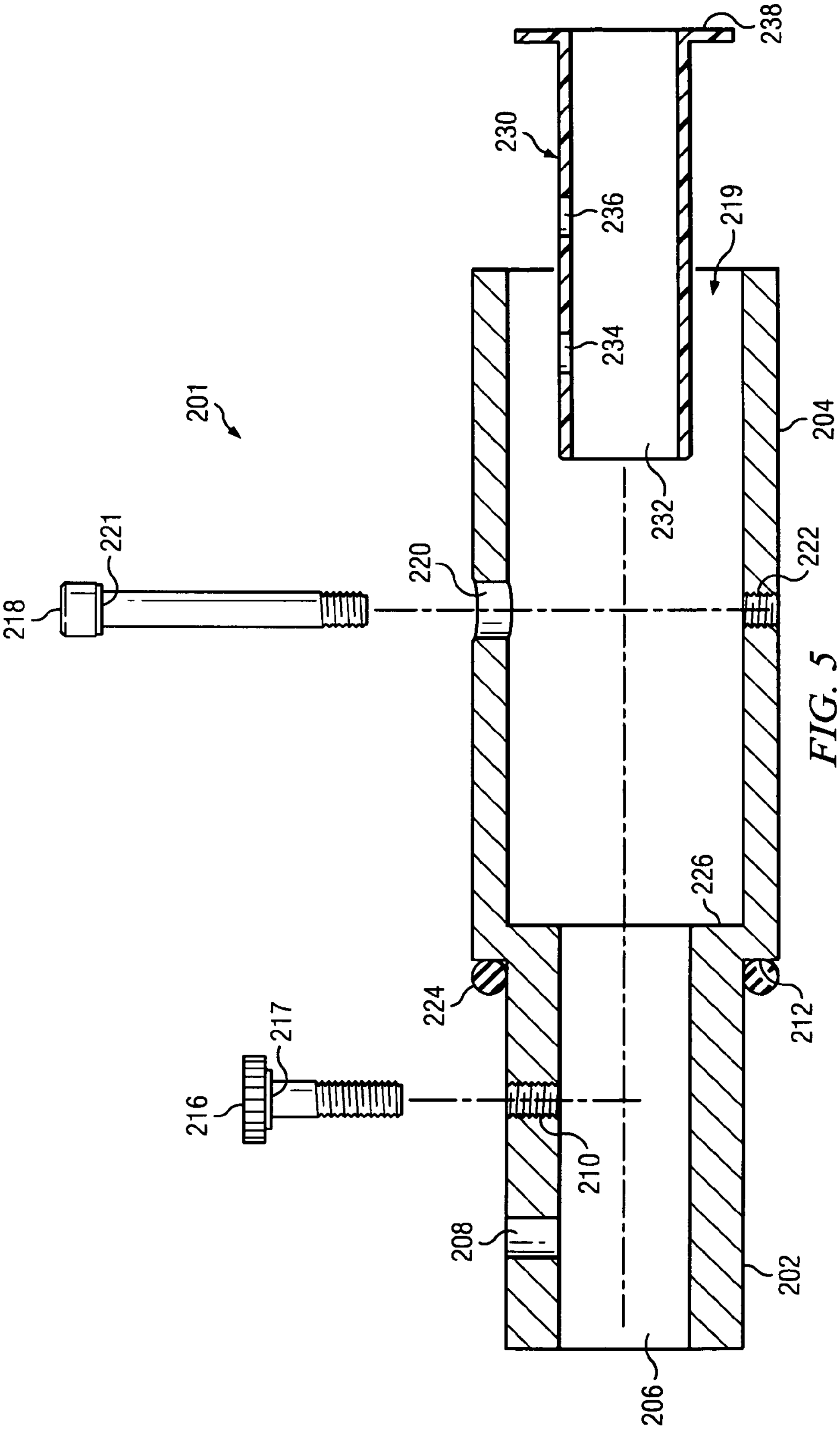
FIG. 5 is an exploded cross-sectional plan view of a preferred embodiment of a connector.

Referring to FIGS. 4 and 5, connector 201 will be described. Connector 201 is generally cylindrical. In a preferred embodiment, connector 201 is made of an aluminum alloy or a magnesium alloy. Rigid polymers may be employed such as Teflon or Dacron. Composites such as wound carbon fiber in resin may be employed with some success. In extremely light duty applications polyvinyl chloride may be employed. Connector 201 includes two sections, connector insert 202 and connector body 204 separated by outer shoulder 212 and inner shoulder 226. The outer diameter of the connector body is generally the same as the outer diameter of the receiver body. The outer diameter of connector insert 202 is sized to nest within the inner diameter of reinforcing collar 119 and opening 117. O-ring 224 is seated against outer shoulder 212 and surrounds the perimeter of connector insert 202. O-ring 224 is preferably rubber or neoprene gasket material. Connector insert 202 is hollowed by locking bar hole 206. Locking bar hole 206 in the preferred embodiment has a square cross-section. In general, locking bar hole 206 has the same cross-section shape as the locking bar. Connector 201 further includes sleeve 230 seated in locking bar hole 206. Sleeve 230 is made of a polyvinyl chloride plastic or other semi-rigid plastic. Sleeve 230 is shaped to fit within locking bar hole 206 and includes a square shaped sleeve hole 232. Sleeve hole 232 is sized to accommodate locking bar 118. Sleeve 230 includes an integrally formed sleeve flange 238. Connector body 204 includes through hole 220 and an axially aligned threaded hole 222. Sleeve 230 further includes through hole 234 and 236. Connector insert 202 also includes through hole 208 and retaining hole 210. Locking screw 216 includes washer 217 and is sized to engage the threads of retaining hole 210 and threaded hole 120. Locking screw 216 is sized to pass through through holes 208, 234, and 114. A first attachment means is shown as retaining pin 218 and washer 221. The head of retaining pin 218 is sized for through hole 220. The threads of retaining pin 218 are sized to engage threaded hole 222. An alternate suitable attachment means is comprised of a hitch pin and latch (See FIG. 7 for reference). An additional alternate attachment means is comprised of a cotter pin. (See FIG. 8 for reference). An additional alternate attachment means is comprised of a hollow bolt having a threaded interior coupled with a screw to engage the interior threads of the bolt (See FIG. 10A for reference).

Figure 6A:
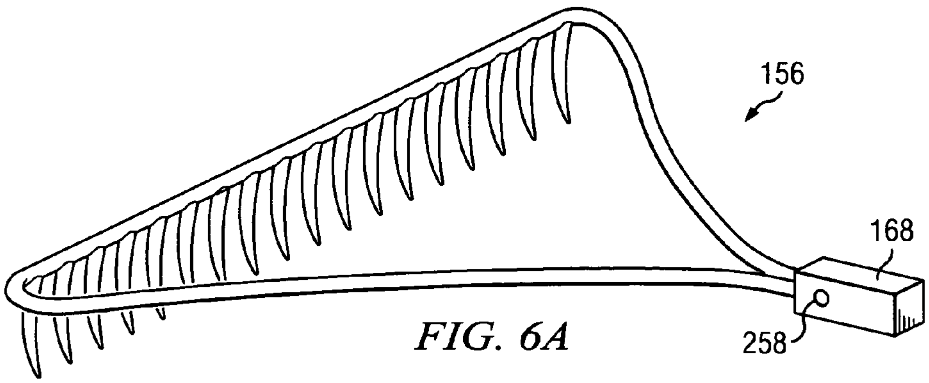
FIG. 6A is an isometric view of an alternate preferred embodiment of a rake head.
Figure 6B:
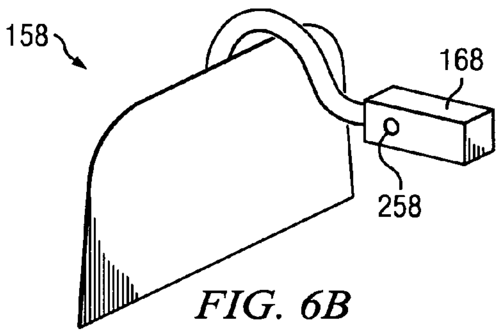
FIG. 6B is an isometric view of an alternate preferred embodiment of a hoe head.

FIGS. 6A and 6B show two additional examples of the tool head, rake head 156 and hoe head 158. Rake head 156 and hoe head 158 may be any number of working shapes and include any number of working features that are common in the art for rakes and hoes and thus are not limited to the specific shape and features shown here. Integrally formed with each alternate tool head is receiver 168. Receiver 168 includes a polygonal cross section having dimensions equal to locking bar 118. In a preferred embodiment, the cross section of the receiver is square. Receiver 168 includes mounting hole 258.

Figure 6C:
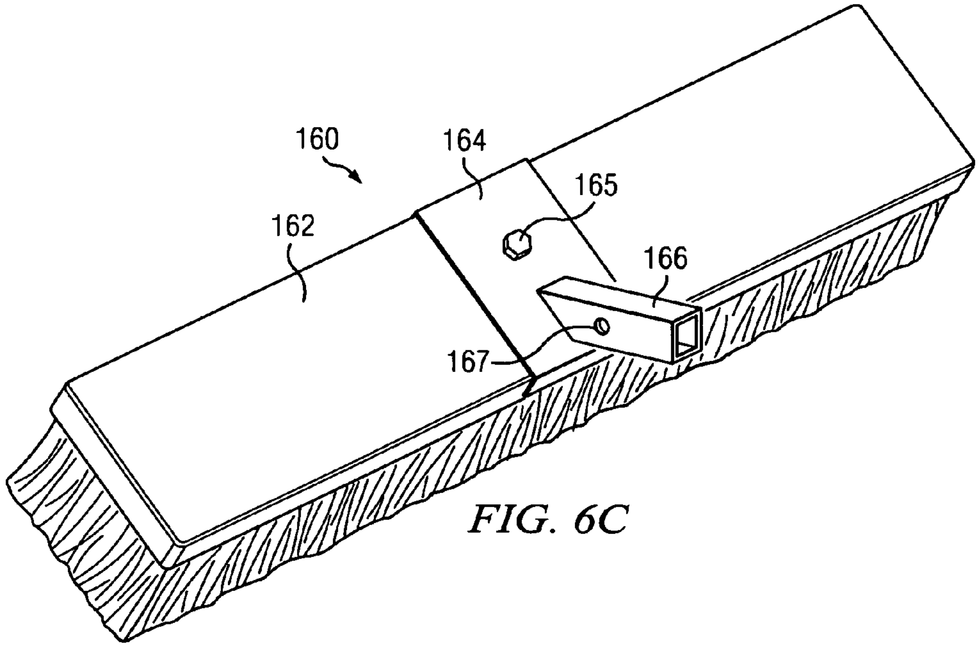
FIG. 6C is an isometric view of an alternate preferred embodiment of a broom head.

Referring to FIG. 6C, another example of the tool head is shown as broom head 160. Broom head 160 is comprised of body 162 from which bristles extend and to which bracket 164 is attached. It is understood that bracket 164 is capable of mounting to any number of broom head designs that are common in the art and therefore the embodiment is not limited to the specific broom head features and dimensions depicted here. Bracket 164 is integrally formed with receiver 166. Receiver 166 extends from bracket 164 at an angle of approximately 30 degrees. Receiver 166 has a polygonal cross section having a shape and dimensions equal to locking bar 118 and receiver 168. Receiver 166 is generally hollow with mounting hole 167 passing entirely through two opposing sides. Bracket 164 is attached to the broom body by retaining bolt 165 or a suitable epoxy.

Figure 7:
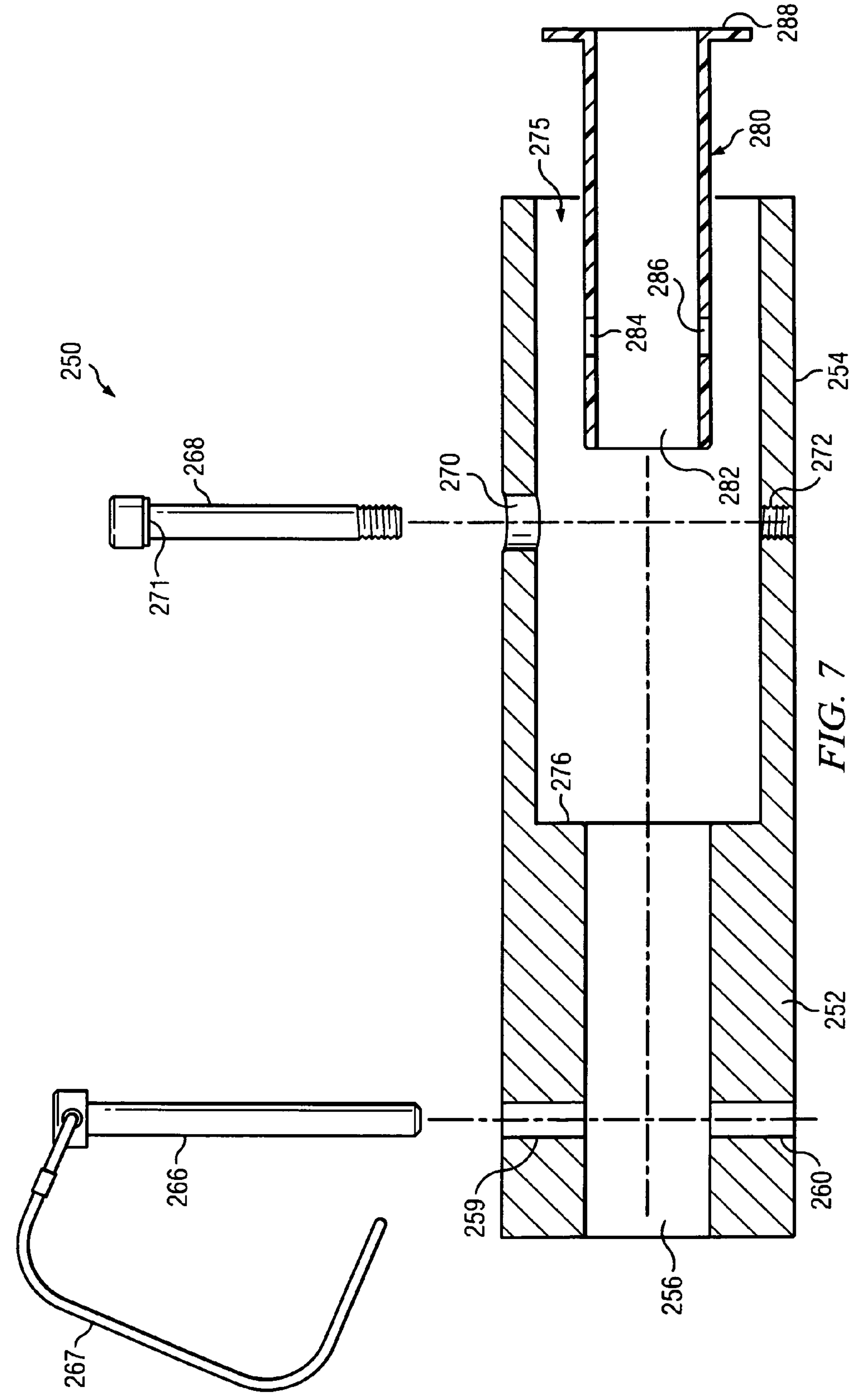
FIG. 7 is an exploded cross-sectional plan view of an alternate preferred embodiment of a connector.

An alternate embodiment of the connector is shown in FIG. 7 as connector 250. Rake head 156, hoe head 158, or broom head 160 is removably coupled to handle 300 by connector 250. Connector 250 is generally cylindrical and in a preferred embodiment is made of an aluminum alloy or a magnesium alloy. Shoulder 276 resides on the internal surface of the connector between receiver end 252 and connector body 254. Connector body 254 has a handle cavity 275. Receiver end 252 includes receiver hole 256. Receiver hole 256 in the preferred embodiment has a square shaped cross section but may assume other polygonal cross sections. Connector 250 includes through holes 259 and 260 which are in axial alignment with each other on opposite sides of connector 250. Through holes 259 and 260 pass through to receiver hole 256. Connector 250 further includes sleeve 280 seated in receiver hole 256. Sleeve 280 is generally constructed of a polyvinyl chloride plastic and is sized to match the shape of receiver hole 256. The sleeve includes square sleeve hole 282. Sleeve 280 includes a disk shaped cap shown as sleeve head 288. Sleeve 280 further includes through holes 284 and 286 in general axial alignment. Hitch pin 266 is sized to fit through through holes 259 and 260. Latch 267 extends from the head of hitch pin 266 to engage the end of hitch pin 266. Retaining pin 268 includes washer 271. The head of retaining pin 268 is sized to fit in through hole 270. The threads of retaining pin 268 are sized to engage threaded hole 272. Accordingly, when sleeve 280 is seated in connector 250, sleeve head 288 is adjacent shoulder 276 while through holes 259, 260, 284, and 286 are all axially aligned. The inner dimensions of sleeve hole 282 are minimally larger than the outer dimensions of receivers 166 and 168 which allow receivers 166 and 168 to be inserted into sleeve hole 282.

Figure 8:
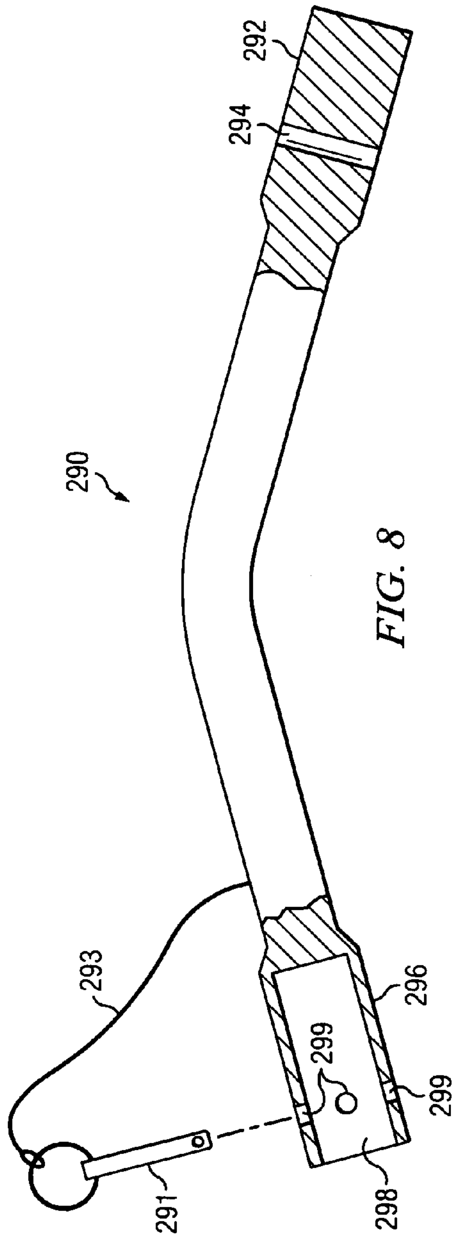
FIG. 8 is a cross-sectional plan view of a preferred embodiment of an extension.

Referring to FIG. 8, extension 290 is shown. Extension 290 is preferably a solid steel rod comprising a central bend of approximately 30 degrees. Integrally formed with extension 290 is head 296 and receiver 292. Head 296 includes a polygonal cross section. In the preferred embodiment the cross section is square. Head 296 includes square hole 298. The inner dimensions of square hole 298 are larger than the outer dimensions of receivers 166 and 168 sufficient to allow receivers 166 and 168 to be inserted into square hole 298. Head 296 includes mounting holes 299. Mounting holes 299 on opposite sides of head 296 are axially aligned with each other. Cotter pin 291 is attached to extension 290 by tether 293. Cotter pin 291 is sized to pass through mounting holes 299, 258, and 167. Receiver 292 is generally solid with a cross section having dimensions equal to locking bar 118 and receivers 166 and 168. Receiver 292 further includes through hole 294 passing entirely through two opposing sides.

Figure 9:
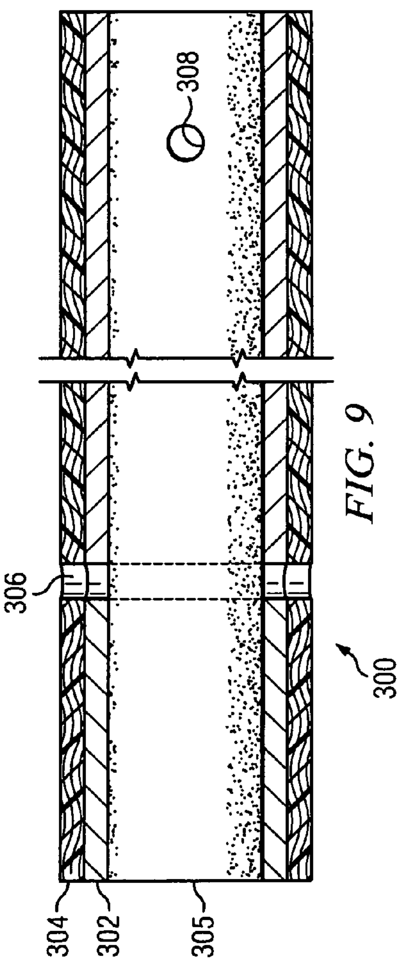
FIG. 9 is a cross-sectional plan view of a preferred embodiment of a handle.

FIG. 9 shows composite handle 300. Handle 300 includes inner tube 302 surrounded by outer tube 304. In the preferred embodiment, inner tube 302 is formed of steel but an aluminum alloy, magnesium or titanium could also suffice. In the preferred embodiment, outer tube 304 is formed from fiberglass. Carbon fiber or Kevlar would also suffice. Inner tube 302 and outer tube 304 are bonded by a suitable adhesive. In another embodiment, the handle is filled with an extruded polystyrene foam 305 to reduce translation of impact vibration through the handle. The outer diameter of outer tube 304 is slightly less than the inner diameter of handle cavity 219 and connector body 254 as previously described. Proximate one end of handle 300 is through hole 306. Through hole 306 is sized to receive retaining pins 218 or 268. Proximate the opposite end of handle 300 is through hole 308. Through hole 308 is oriented generally perpendicularly to through hole 306.

Figure 10A:
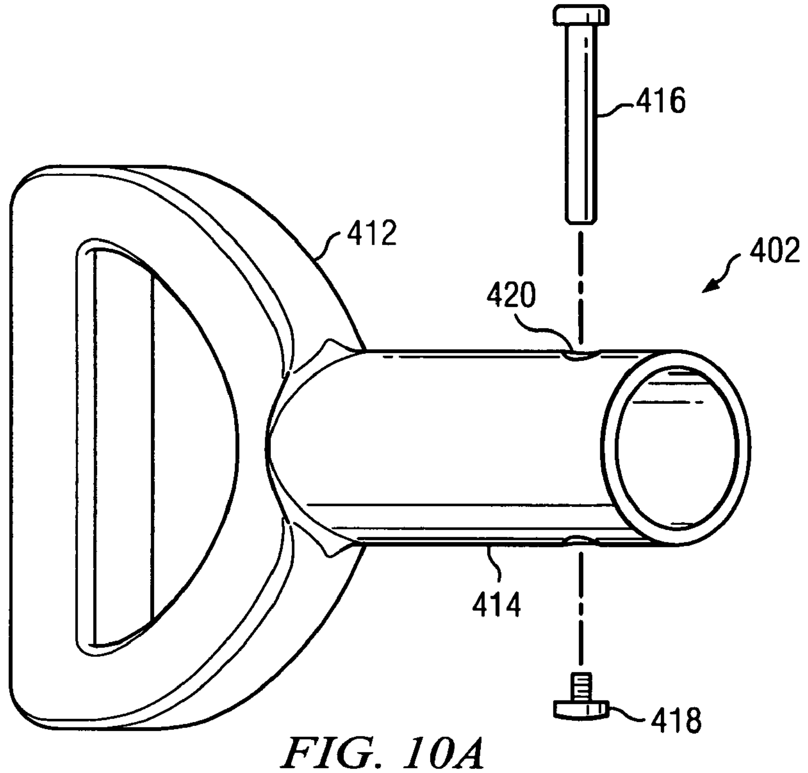
FIGS. 10A, 10B and 10C are isometric views of a preferred embodiment of the grip.
Figure 10C:
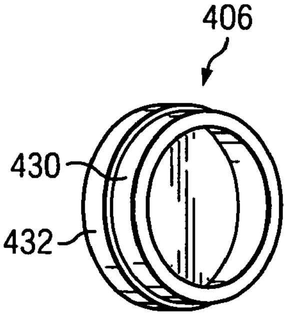
Figure 10B:
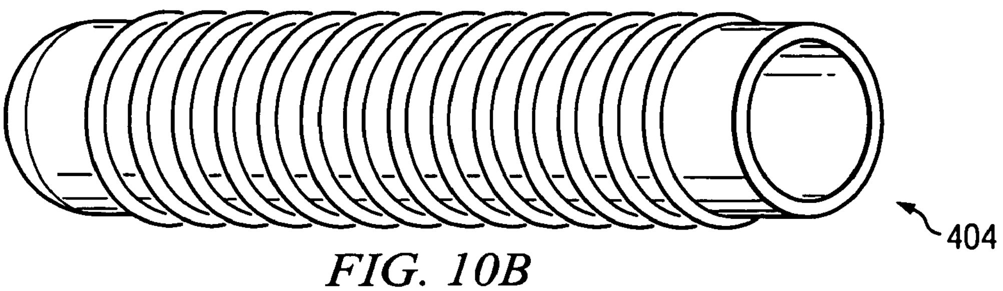

FIGS. 10A, 10B, and 10C show multiple examples of the grip, specifically, D-grip 402, cap grip 404, and plug 406. In a preferred embodiment, D-grip 402 is formed from a vinyl plastic but vulcanized rubber will also suffice. Other grip material such as neoprene will suffice. D-grip 402 has a "D" shaped handle 412 integrally formed with body 414. Body 414 is tubular in shape and hollow. Body 414 is sized to fit over one end of handle 300. Near the end of body 414 is through hole 420. Through hole 420 passes through both sides of body 414. The body of pin 416 is sized to fit through through hole 420 and is hollow. The end of pin 416 opposite its head is open and threaded on the interior to receive screw 418. In a preferred embodiment, cap grip 404 is generally formed of rubber or durable synthetic rubber foam. Cap grip 404 is generally tubular in shape. Cap grip 404 is sized to accommodate handle 300 and is held in place with friction or a suitable adhesive. In a preferred embodiment, plug 406 is formed of plastic but could also be rubber. Plug 406 includes a tubular body and head 432. Head 432 extends just beyond the perimeter of body 430. Body 430 is sized to slip inside one end of handle 300 and is held in place with friction or suitable adhesive.

Figure 11:
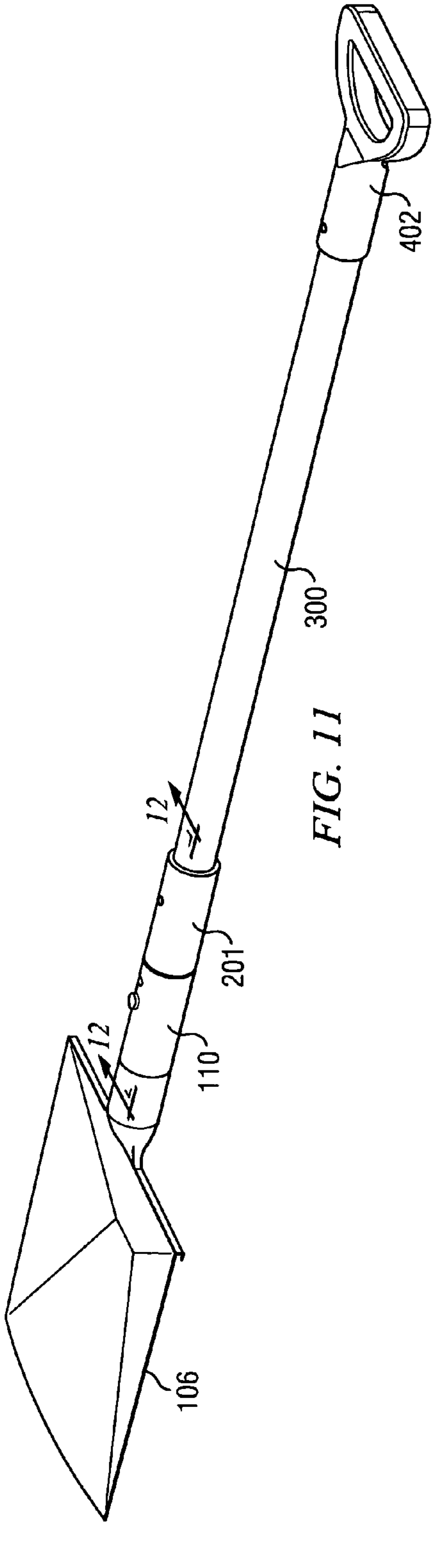
FIG. 11 is an isometric view of a preferred embodiment of the modular tool component system assembled.

FIG. 11 shows an assembled shovel type tool. Shovel head 106 and receiver 110 are removably coupled to connector 201. Connector 201 is removably secured to handle 300 and D-grip 402 is removably attached to handle 300. A pick-axe type tool, an axe type tool, a hammer type tool, a rake type tool, a hoe type tool, and a broom type tool are assembled in an identical fashion using pick-axe head 108, axe head 105, hammer head 107, rake head 101, hoe head 103, and broom head 104 respectively.

Figure 12:
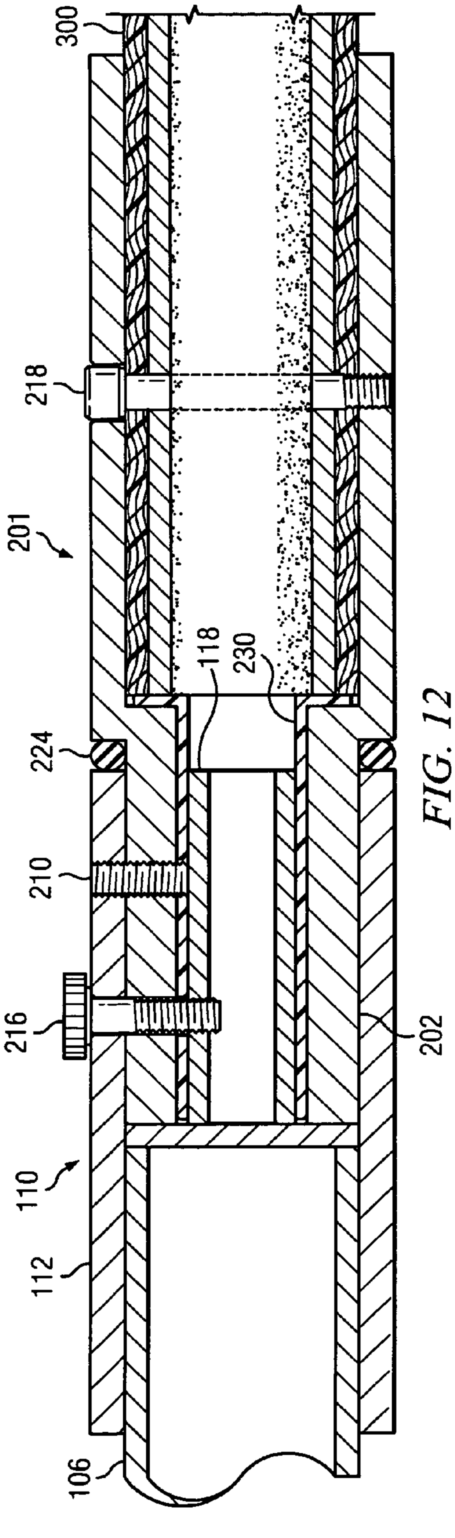
FIG. 12 is a cross-sectional plan view of a preferred embodiment of an assembled receiver, connector, and handle.

FIG. 12 shows a cross section view of the assembled components. Shovel head 106 and receiver 110 are coupled to connector 201. Connector 201 is secured to handle 300.

In use, sleeve 230 is inserted in locking bar hole 206 until sleeve flange 238 is adjacent inner shoulder 226. In turn, connector insert 202 is inserted into opening 117 moving locking bar 118 into sleeve hole 232. When through hole 208 is aligned with through hole 114 and threaded hole 120, locking screw 216 is inserted through through holes 114 and 208 and threaded into threaded hole 120 thereby securing connector insert 202 within opening 117 and locking bar 118 within sleeve hole 232. Outer reinforcing collar 119 sandwiches O-ring 224 against outer shoulder 212 thereby deforming O-ring 224 and resiliently biasing the receiver and connector to prevent unwanted rotation of the locking screw during use and so serves to lock the locking screw in place. The bias also serves to reduce the transmission of impact vibrations to and from the handle thus reducing fatigue stress and wear on all components. O-ring 224 further functions to seal against liquid penetration thereby providing an air tight seal between the outside environment and the interior of locking bar 118. Similarly, washers 217 and 221 provide a seal between the environment and the interior of the openings and the interior of the locking bar and the handle.

In practice the sleeve also reduces transmission of impact loading and vibrations between the parts and so also serves to extend the useful life of the tool. Further, the sleeve serves to electrically insulate the connector from the tool head thereby preventing electron migration and chemical welding of the parts during use, further serving to increase the life of the tool.

When not in use, locking screw 216 may be threaded into retaining hole 210 to prevent loss during transport or storage.

When assembled, the connector provides excellent resistance to axial loads, torsional loading about the longitudinal tool axis (twisting) and bending moments about any radial axis. For example, axial loads are distributed by locking bar 118 and disk 116 to the complete internal circumference of the receiver and by outer shoulder 212 to the complete outer circumference of the connector. Torsional loading is resisted by the various surfaces of the locking bar in cooperation with disk 116, locking screw 216 and retaining pin 218. Bending moments are likewise resisted by the overlap and engagement of the reinforcing collar with the connector insert and the overlap and engagement of the locking bar with the locking bar hole.

FIG. 12 further shows handle 300 engaged with connector 201. Handle 300 is inserted into handle cavity 219. Once through holes 220 and 306 and threaded hole 222 are axially aligned, retaining pin 218 passes through through holes 220 and 306 and the threads of retaining pin 218 engage threaded hole 222. Retaining pin 218 is tightened resulting in connector 201 and handle 300 securely yet removably engaged. The plastic outer tube serves dual purposes. First, it provides structural resiliency to the metallic inner tube thereby preventing "crimping" failure of the inner tube. Second, the plastic outer tube provides the advantage of being an insulating material slowing or preventing transmission of electricity and heat to the hands of the user thereby increasing safety and comfort during use. The metallic inner tube increases the toughness of the plastic outer tube thereby increasing the resistance of the tool to splintering and cracking failure caused by repeated impact loading.

Figure 13:
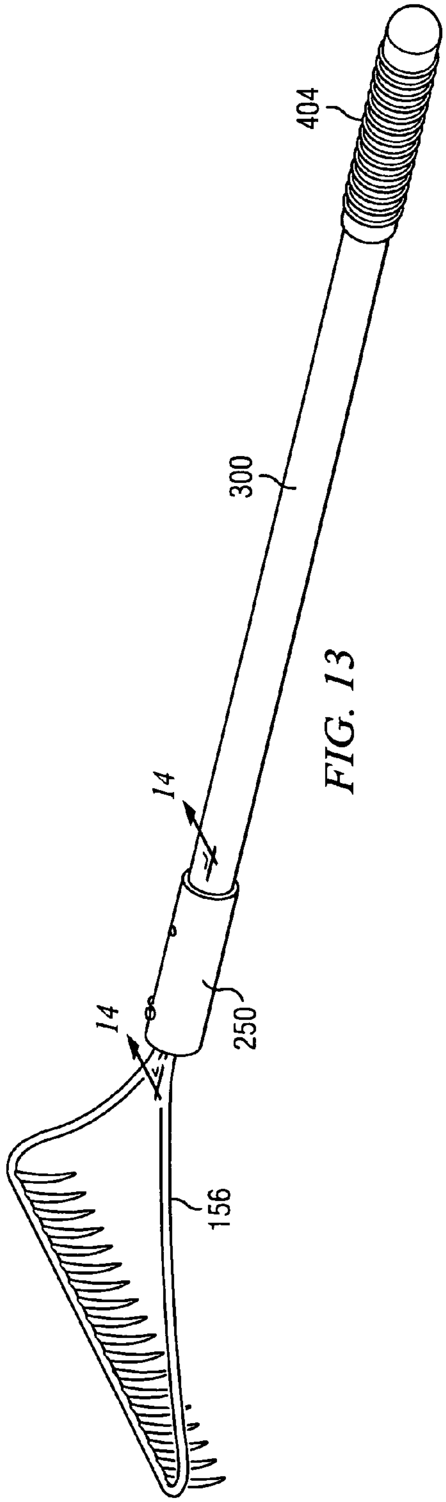
FIG. 13 is an isometric view of a preferred embodiment of the modular tool component system assembled.

FIG. 13 shows an assembled rake type tool. Rake head 156 is integrally formed to be one piece with receiver 168. Receiver 168 is removably coupled to connector 250. Connector 250 is removably secured to handle 300 and cap grip 404 is removably attached to handle 300. A hoe type tool and a broom type tool are assembled in an identical fashion using hoe head 158 and broom head 160.

Figure 14:
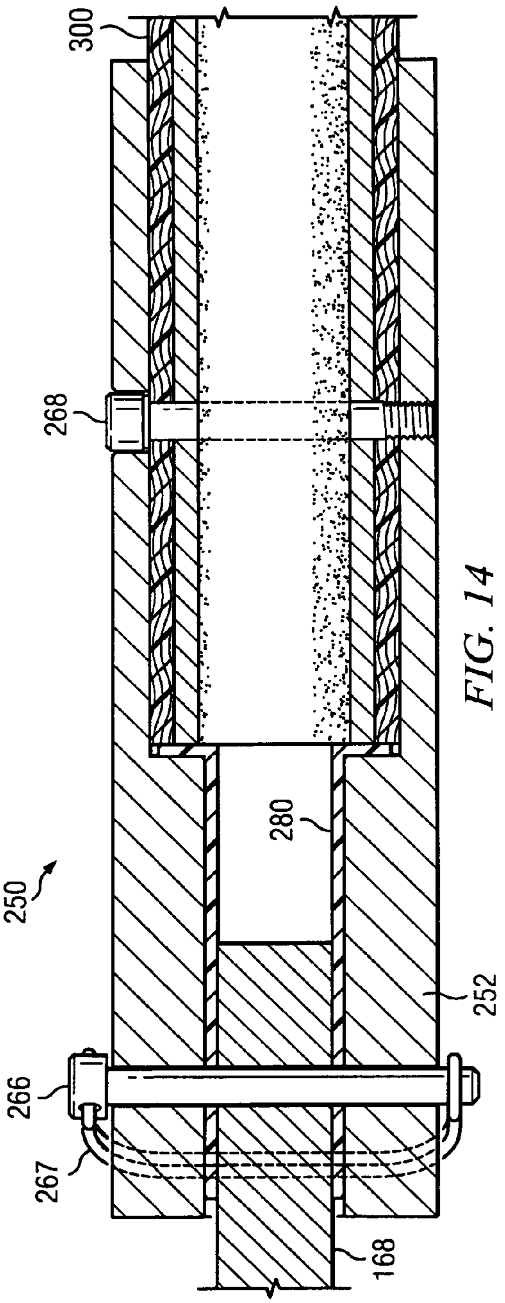
FIG. 14 is a cross-sectional plan view of an alternate preferred embodiment of an assembled receiver, connector, and handle.

FIG. 14 shows a view of the connections of the components from the tool head to the handle. Receiver 168 of rake head 156 is coupled to connector 250 and connector 250 is secured to handle 300.

Receiver 168 is inserted into sleeve 280 until mounting hole 258 is aligned with through holes 259 and 260. When the holes are aligned, hitch pin 266 is inserted through through holes 259 and 260 and mounting hole 258 until hitch pin 266 emerges on the opposite side of receiver end 252. Once latch 267 is extended over the end of hitch pin 266, rake head 156 and connector 250 are securely yet removably secured. When connector 250 is not attached to a tool head, hitch pin 216 can be securely stored in through hole 260 by latch 267.

FIG. 14 further shows handle 300 securely connected with connector 250. Handle 300 is inserted into the open end of connector body 254. Once through holes 270 and 306 are axially aligned, retaining pin 268 is inserted through through holes 270 and 306 and the threads of retaining pin 268 engage threaded hole 272. Retaining pin 218 is tightened resulting in connector 250 and handle 300 securely yet removably engaged. Washer 271 provides a seal between the environment and the interior of the opening and the interior the handle. The alternate attachment means previously shown and described may also be used without detracting from the broad inventive concept thereof.

Figure 15:
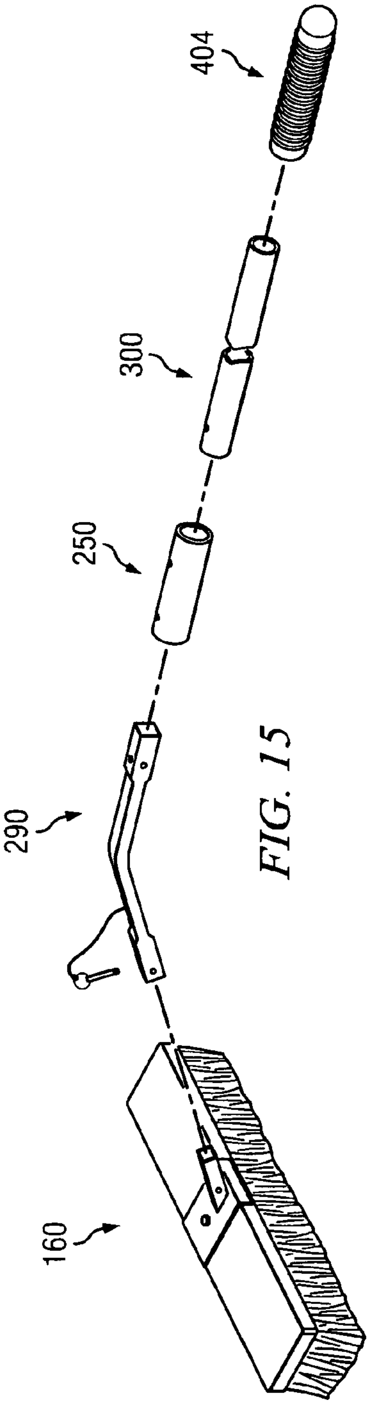
FIG. 15 is an exploded isometric view of a preferred embodiment of the modular tool component system.
Figure 16:
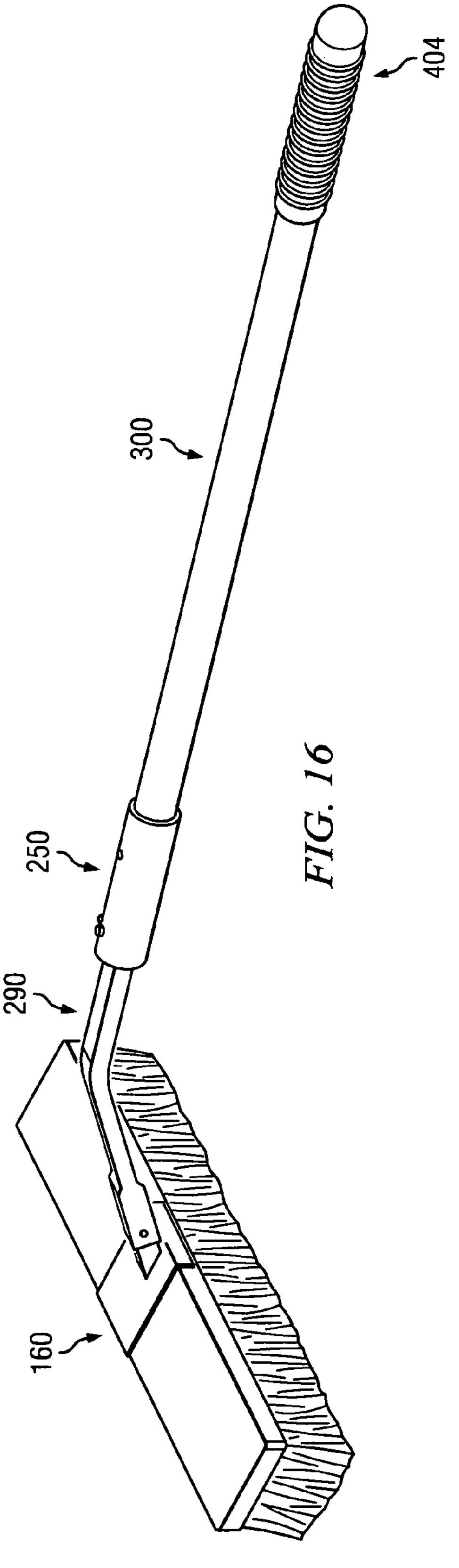
FIG. 16 is an isometric view of a preferred embodiment of the modular tool component system assembled.

An alternate embodiment of an assembled broom type tool incorporating extension 290 is shown in FIGS. 15 and 16. The connections are identical to what was previously described for a broom type tool except for the addition of extension 290. Extension 290 allows for the user of the tool to achieve a variable working angle for the head of the tool.

Receiver 166 is inserted in to square hole 298. Once mounting holes 299 and 167 are aligned, cotter pin 291 is inserted through mounting holes 299 and 167 to securely and removably couple extension 290 to broom head 160. Receiver 292 is inserted in to sleeve 280 until through holes 259, 260 and 294 are aligned. When the holes are aligned, an attachment means is used to securely couple extension 290 to connector 250. Handle 300 is attached to connector 250 and the desired grip is also attached as previously described.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An industrial long handled tool comprising:
- a tool head having a receiver with a first axis;
- the receiver including a reinforcing collar with a cylindrical internal surface coaxial with the first axis;
- the receiver including an internal mounting plate generally perpendicular to the first axis;
- the receiver including a polygonal locking bar rigidly affixed to the internal mounting plate coaxial with the first axis;
- a connector having a connector insert with a cylindrical exterior surface;
- the connector insert further including a polygonal locking bar hole;
- the connector further including a handle cavity;
- a first attachment means, engaging the receiver and the connector, for securing the receiver to the connector;
- whereby the cylindrical internal surface is in fixed contact with the cylindrical external surface and the polygonal locking bar is in fixed contact with the polygonal locking bar hole; and
- a second attachment means, engaging the connector and a handle, for securing the handle cavity to the handle.

2. The industrial long handled tool of claim 1 wherein the polygonal locking bar has a first square cross section and the polygonal locking bar hole has a second square cross section; and wherein the first square cross section nests within the second square cross section.

3. The industrial long handled tool of claim 1 further comprising a polygonal sleeve between the polygonal locking bar and the polygonal locking bar hole.

4. The long handled tool of claim 1 further comprising a resilient annular gasket, adjacent the receiver and the connector, for biasing the receiver away from the connector and sealing a connection between the receiver and the connector.

5. The long handled tool of claim 1 where in the first attachment means includes a sealed bolt in cooperation with a first threaded retainer in the connector and a second threaded retainer in the polygonal locking bar.

6. The long handled tool of claim 1 wherein the second attachment means includes a sealed bolt in cooperation with a first threaded retainer in the connector.

7. The long handled tool of claim 1 further comprising a grip reasonably attached to the handle.

8. The long handled tool of claim 1 wherein the handle is further comprised of a rigid weight bearing metallic tube nested within a rigid weight bearing non-metallic tube.

9. The long handled tool of claim 8 wherein the metal tube is filled with a plastic vibration dampening foam.

10. The long handled tool of claim 1 wherein the tool head comprises one of the group of shovel, pick-axe, axe, hammer, rake, hoe, and broom.

11. A modular tool component system, the system comprising:

a tool head rigidly connected to a generally cylindrical hollow receiver, where the receiver is separated by a generally perpendicularly oriented disk, into a first part for connection to the tool head and a second part having a first opening for connection to a connector;

the receiver further comprising a polygonal extension rigidly mounted to and extending from the disk and concentrically aligned within the first opening and not extending past the first opening;

the connector further comprising a generally hollow cylindrical body separated into a first section and a second section by a shoulder where the first section defines a center axially aligned four sided hole and where the second section has a second opening for connection to a first end of a handle;

a sleeve seated in the four sided hole for engagement with the extension;

a grip removably attached to a second end of the handle;

a first attachment means passing through the second part, the first section, the sleeve, and the extension for removably securing the receiver to the connector; and a second attachment means passing through the second section and the first end of the handle for removably securing the connector to the handle.

12. The modular tool component system of claim 11 where the cross section of the extension is a square.

13. The modular tool component system of claim 11 where the handle further comprises an inner tube and an outer tube.

14. The modular tool component system of claim 11 further comprising an O-ring adjacent the shoulder and surrounding the first section.

15. The modular tool component system of claim 11 where the extension extends past the first opening.

16. The modular tool component system of claim 11 where the tool head comprises one of the group of shovel, pick-axe, axe, hammer, rake, hoe, and broom.

17. The modular tool component system of claim 11 where the grip comprises one of the group of D-grip, cap grip, and plug.

18. The modular tool component system of claim 11 further comprising a third attachment means passing through the second end of the handle and the grip and where the grip is a D grip.

19. An interchangeable tool component system, the system comprising;

a tool head having a working element and a four sided extension, where the extension includes a mounting hole;

a generally hollow cylindrical shaped connector divided into a first section and a second section by a shoulder where the first section defines a center axially aligned four sided hole and where the second section has an opening for connection to a first end of a handle;

a sleeve seated in the four sided hole for engagement with the extension;

a grip removably attached to a second end of the handle;

a first attachment means, passing through the first section, the extension, and the sleeve, for removably securing the tool head to the connector; and a second attachment means, passing through the second section and the first end of the handle, for removably securing the connector to the handle.

20. The interchangeable tool component system of claim 19 where the tool head is integrally formed from one piece with the extension.

21. The interchangeable tool component system of claim 19 where the extension extends from a bracket and where the bracket is removably mounted to the tool head.

22. The interchangeable tool component system of claim 19 further comprising an angled extender where the extension is removably connected to the angled extender and the angled extender is removably connected to the connector.

23. The interchangeable tool component system of claim 19 where the cross section of the extension is square.

24. The interchangeable tool component system of claim 19 where the handle further comprises an inner tube and an outer tube.

25. The interchangeable tool component system of claim 19 where the tool head comprises one of the group of shovel, pick-axe, axe, hammer, rake, hoe, and broom.

26. The interchangeable tool component system of claim 19 where the grip comprises one of the group of D-grip, cap grip, and plug.

27. The interchangeable tool component system of claim 19 further comprising a third attachment means passing through the second end of the handle and the grip and where the grip is a D grip.

* * * * *